June 9, 1964 W. J. WHITE 3,136,162
DYNAMIC BALANCING APPARATUS
Filed June 30, 1961 7 Sheets-Sheet 3
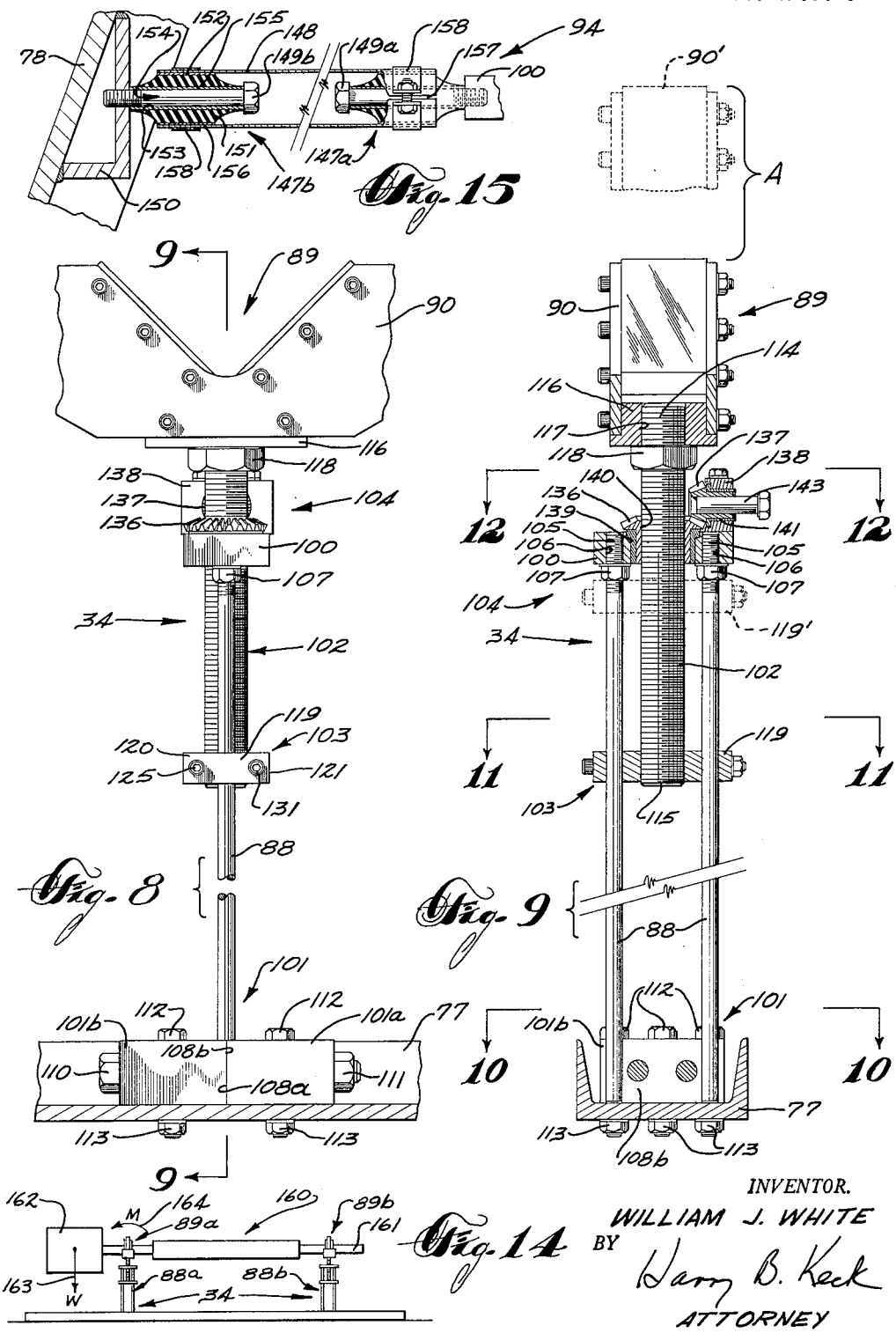
INVENTOR.
WILLIAM J. WHITE
BY Harry B. Keck
ATTORNEY

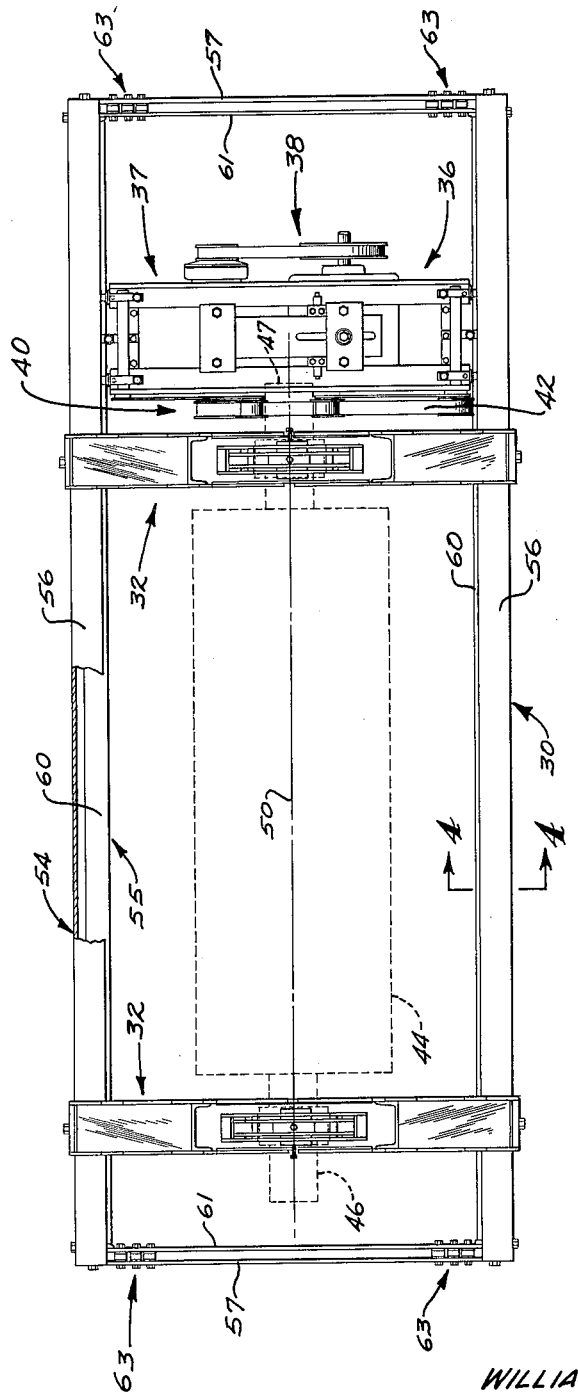

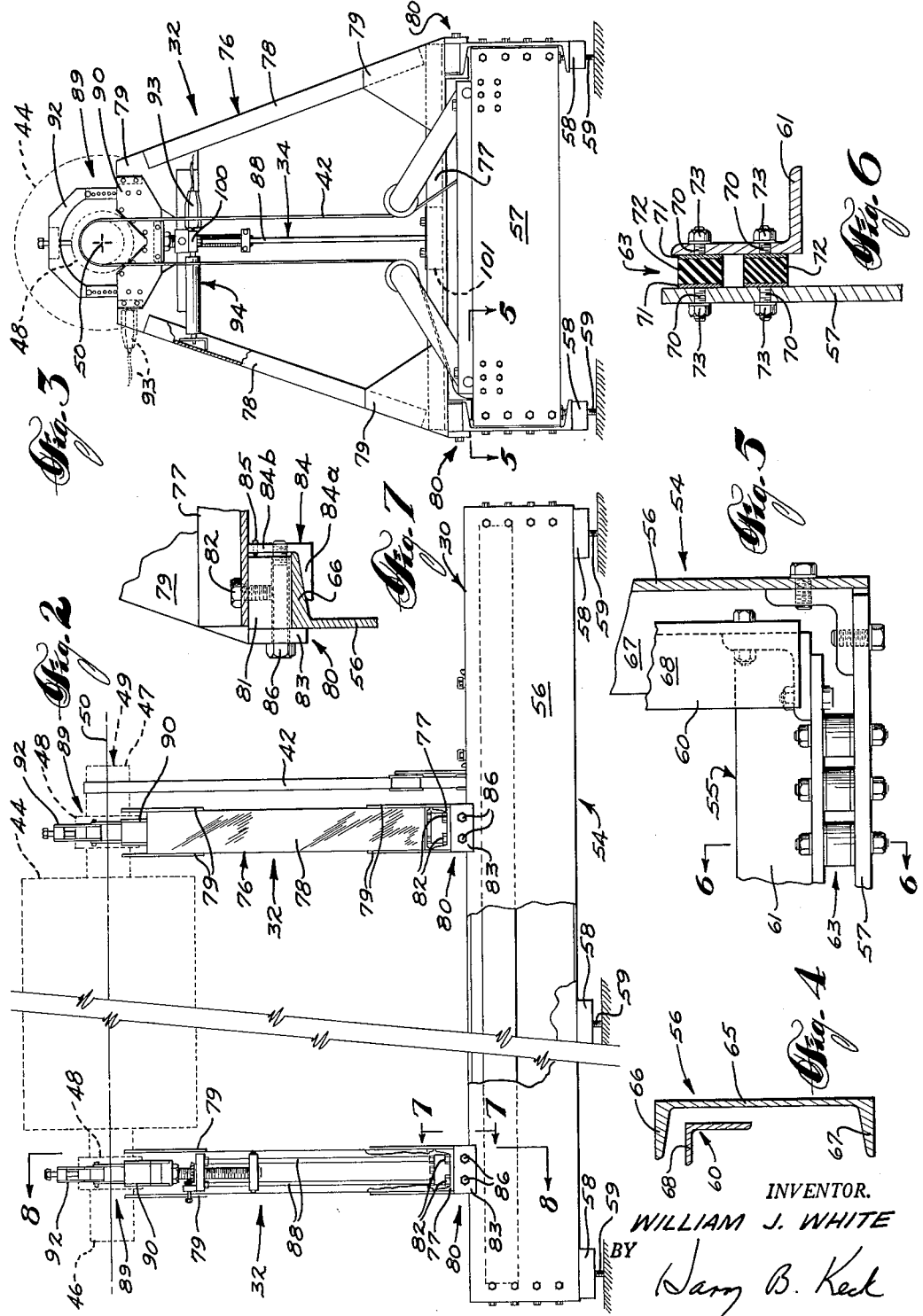

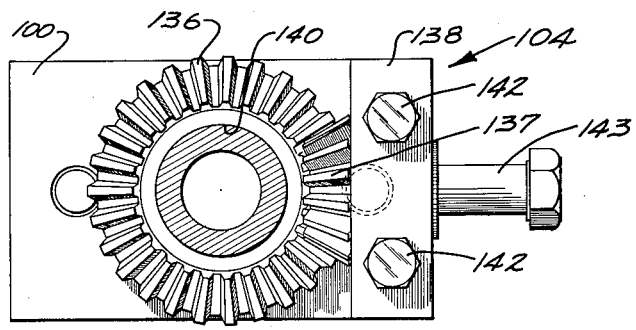
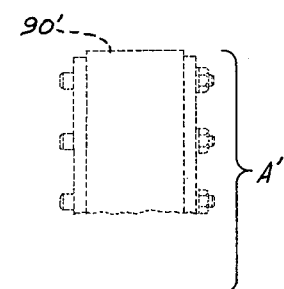
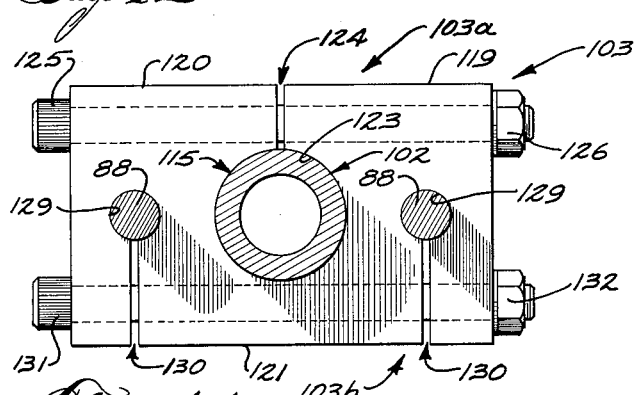
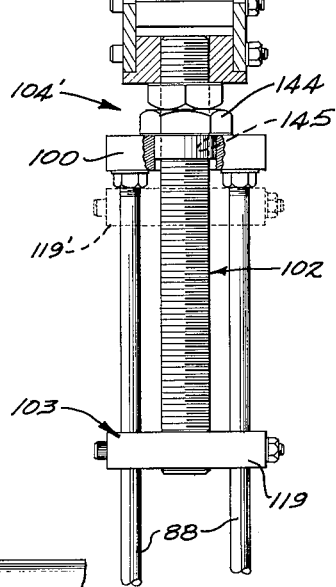
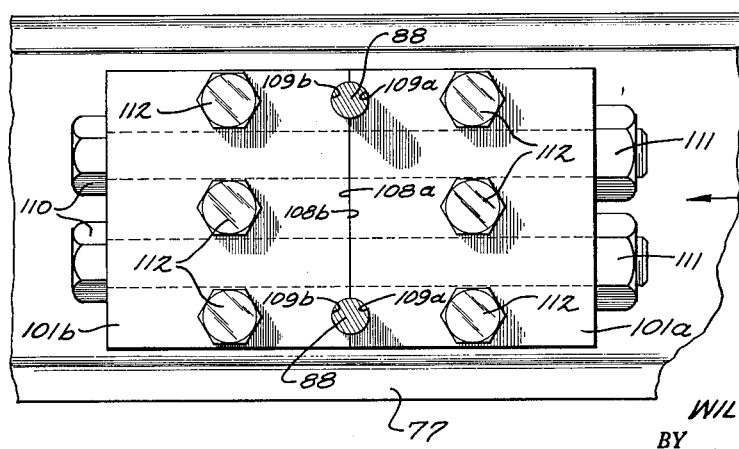
INVENTOR.
WILLIAM J. WHITE

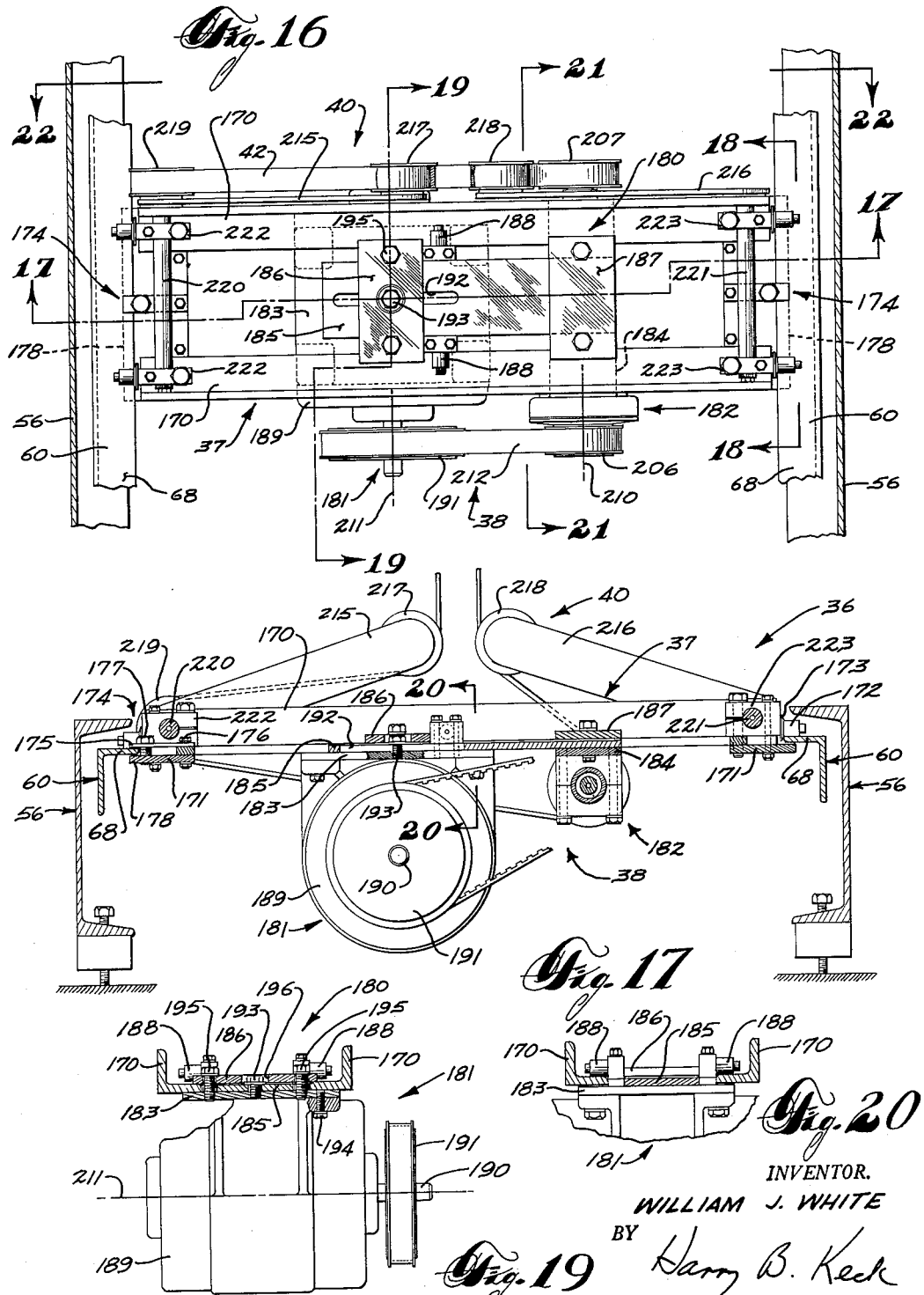

June 9, 1964 W. J. WHITE 3,136,162
DYNAMIC BALANCING APPARATUS
Filed June 30, 1961 7 Sheets-Sheet 6
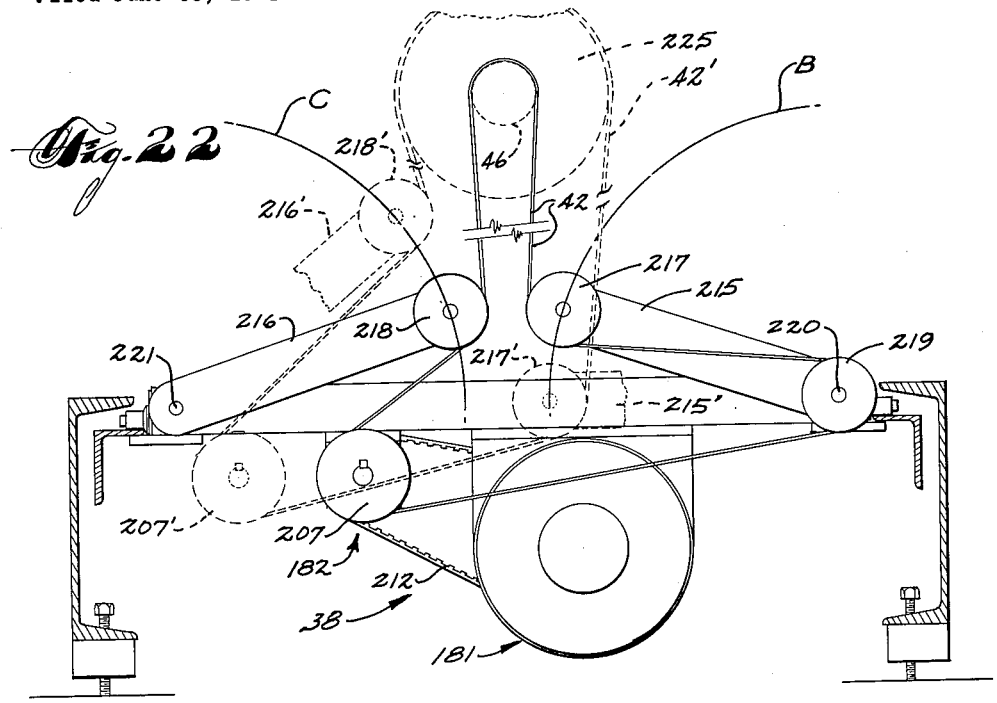
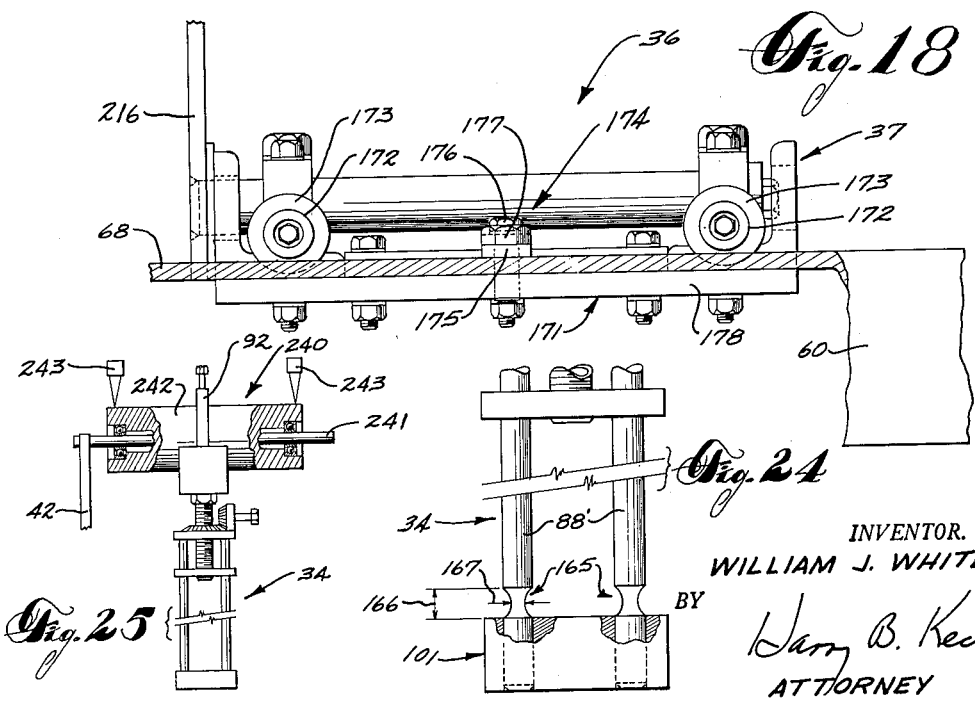
INVENTOR.
WILLIAM J. WHITE
BY
Harry B. Keck
ATTORNEY

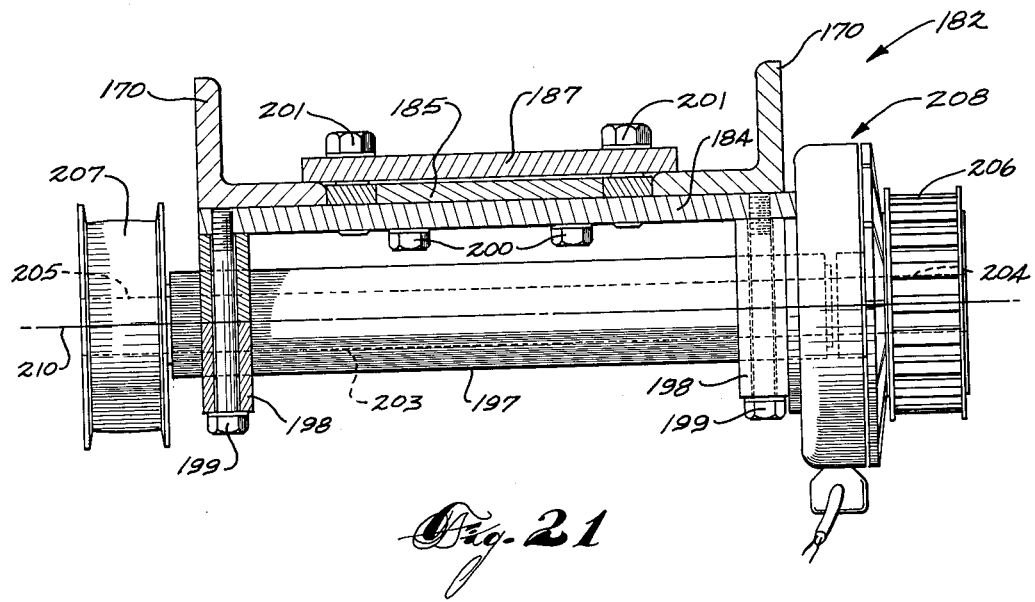
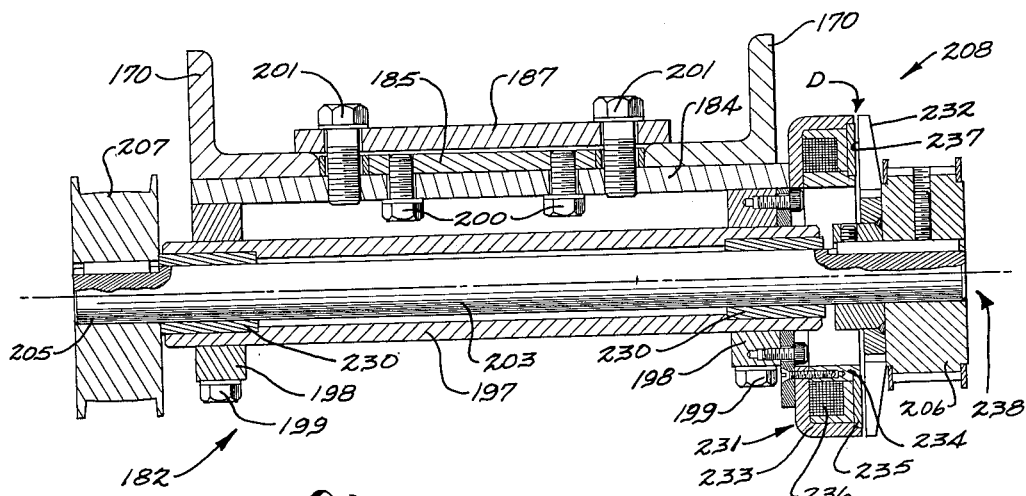

United States Patent Office 3,136,162
Patented June 9, 1964

3,136,162
DYNAMIC BALANCING APPARATUS
William J. White, Columbus, Ohio, assignor to International Research & Development Corporation
Filed June 30, 1961, Ser. No. 121,132
28 Claims. (Cl. 73—477)

The present invention relates to dynamic balancing apparatus. More particularly the present invention relates to unitary balancing apparatus which horizontally and rotatably supports a rotor for determining the imbalance of said rotor.

The present invention finds particular utility in supporting rotors such as carden shafts, camshafts, grinding spindles, electric motor rotors and the like.

The primary object of this invention is to provide balancing support stands which utilize a novel flexible reeds structure for supporting a rotor.

Another object of this invention is to provide a novel flexible reeds structure that is extensible so that the natural frequency of the supports may be changed.

Still another object of this invention is to provide a novel flexible reeds structure whose natural frequency may be changed while the supported rotor is rotating.

Yet another object of this invention is to provide a balancing support stand that may be used (a) in pairs to support relatively large rotors or (b) singularly to support relatively small rotors.

A further object of this invention is to provide balancing support stands that may be used in pairs so that one stand is under a compressive load while the other balancing stand is under a tensile load.

A still further object of this invention is to provide an extensible rotor support that has a variable sensitivity, i.e., a rotor support whose sensitivity to vibrations may be increased when the vibratory amplitude is minute.

Another object of this invention is to provide balancing apparatus that is a unitary structure.

Another object of this invention is to provide a unitary balancing apparatus that is relatively inexpensive to manufacture.

Another object of the present invention is to provide a relatively lightweight base that effectively isolates the balancing stands from extrinsic vibrations generated by the rotor drive means.

Still another object of this invention is to provide a carriage assembly supporting a high speed drive means, which carriage is positionable along the base of the assembly to drive a rotor from any convenient plane of the rotor.

Yet another object of this invention is to provide a belt guide means in a balancing apparatus that permits the use of a single belt length to drive rotors of different diameters.

A further object of this invention is to provide a belt guide means that permits the use of a single belt length to drive a rotor supported at different elevations above a high speed drive unit.

A still further object of this invention is to provide unitary balancing apparatus in which the rotor may be quickly mounted and removed.

These and other objects and advantages of the present invention will become apparent from the following detailed description by reference to the accompanying drawings in which:

FIGURE 1 is a plan view of the balancing apparatus of the present invention with portions cut away to show details;

FIGURE 2 is a side elevation of the balancing apparatus of FIGURE 1 with portions cut away to show details;

FIGURE 3 is an end elevation view of the balancing apparatus of FIGURE 1 with portions cut away to show details and particularly illustrating the balancing support stands of the present invention;

FIGURE 4 is a cross-sectional view taken along the line 4—4 of FIGURE 1;

FIGURE 5 is a cross-sectional view taken along the line 5—5 of FIGURE 3;

FIGURE 6 is a cross-sectional view taken along the line 6—6 of FIGURE 5;

FIGURE 7 is a cross-sectional view taken along the line 7—7 of FIGURE 2;

FIGURE 8 is a fragmentary cross-sectional view taken along the line 8—8 of FIGURE 2;

FIGURE 9 is a cross-sectional view taken along the line 9—9 of FIGURE 8;

FIGURE 10 is a cross-sectional view taken along the line 10—10 of FIGURE 9;

FIGURE 11 is a cross-sectional view taken along the line 11—11 of FIGURE 9;

FIGURE 12 is a cross-sectional view taken along the line 12—12 of FIGURE 9;

FIGURE 13 is a fragmentary cross-sectional view similar to FIGURE 9, illustrating an alternative embodiment;

FIGURE 14 is a schematic illustration of a specific application of the present rotor supports;

FIGURE 15 is a fragmentary elevation view, partly in cross-section, illustrating a damping means shown in FIGURE 3;

FIGURE 16 is a fragmentary plan view illustrating a carriage assembly of the present invention;

FIGURE 17 is a cross-sectional view taken along the line 17—17 of FIGURE 16;

FIGURE 18 is a cross-sectional view taken along the line 18—18 of FIGURE 16;

FIGURE 19 is a cross-sectional view taken along the line 19—19 of FIGURE 16;

FIGURE 20 is a cross-sectional view taken along the line 20—20 of FIGURE 17;

FIGURE 21 is a cross-sectional view taken along the line 21—21 of FIGURE 16;

FIGURE 22 is a cross-sectional view taken along the line 22—22 of FIGURE 16;

FIGURE 23 is a cross-sectional view illustrating the internal construction of the element shown in FIGURE 21;

FIGURE 24 is a schematic illustration of an alternative embodiment of the present rotor support; and FIGURE 25 is a schematic illustration of a singular use of the present rotor support.

(I) *Balancing Apparatus*

Referring to FIGURES 1, 2 and 3, the present unitary balancing apparatus generally comprises a base 30 to which balancing support stands 32 are moveably secured. Each balancing support stand 32 includes a support structure comprising a novel extensible rotor support 34 which can best be seen in FIGURES 2 and 3. A carriage assembly 36 is resiliently supported by the base 30 and includes a cradle frame 37, a unitary driving means 38, a drive belt guide means 40 and a drive belt 42.

Illustrated in phantom outline is a rotor 44 having shaft ends 46, 47 each including journal bearings 48 which are supported on the balancing support stands 32. The shaft end 47 includes a terminal portion 49 extending outboard of one of the support stands 34. Also illustrated is a rotational axis 50 of the rotor 44. The drive belt 42 is in driving contact with the terminal portion 49.

Generally then, the balancing support stands 32 are separately positionable along the base 30 and provide for horizontally supporting the rotor 44. Further, the carriage assembly 36 is so constructed and supported on the base 30 that it may pass beneath the support stands 32 and be positioned to drive the rotor 44 from any convenient point on the rotor 44 or its rotor shaft 46, 47.

Having generally described the present balancing apparatus, the various components mentioned above will now be described in detail.

(II) *The Base 30*

Referring to FIGURES 1, 2 and 3, the base 30 includes an external frame 54 and a rigid internal frame 55. The external frame 54 includes a pair of side rails 56 and a pair of end members 57 one each secured transversely between the adjacent ends of the side rails 56. The external frame 54 further includes a plurality of base blocks 58 secured at spaced points along the bottom of the side rails 56 and leveling bolts 59 which serve to level the base 30.

The rigid internal frame 55 includes a pair of side tracks 60 and a pair of end members 61 one each secured transversely between the adjacent ends of the side tracks 60.

The base 30 further includes a plurality of resilient connecting means 63 extending between the adjacent end members 57, 61 of the external frame 54 and the internal frame 55.

Referring now to FIGURE 4, each of the side rails 56 comprises a C-shaped channel member having a web portion 65 and inwardly directed horizontal upper and lower flanges 66, 67. Each of the side tracks 60 comprise an inverted L-shaped member having an inwardly directed horizontal flange which defines an inwardly directed platform 68. As shown the side track 60 is spaced inwardly from the web portion 65 and below the horizontal upper flange 66.

In FIGURE 5 there is illustrated a typical corner construction of the base 30. As can be seen the internal frame 55 is supported from the external frame 54 solely by means of the plurality of resilient connecting means 63. Preferably a group of connecting means 63 is positioned between each of the adjacent end members 57, 61 and quite close to each side track 60 as illustrated.

The resilient connecting means 63 is further illustrated in FIGURE 6 and comprises a pair of spaced-apart bolts 70 each having a relatively thin head 71. A plug of elastomeric material, such as rubber, is bonded to the heads 71 and thereby resiliently connects the pair of spaced-apart bolts 70. Each of the bolts 70 is secured to one of the adjacent end members 57, 61 by means of nuts 73 as shown.

Preferably the longitudinal length of the external frame 54 and the internal frame 55 is such that the resilient connecting means 63 are not compressed between the adjacent end members 57, 61. Also it is preferable that the axial length of each connecting means 63 be small enough so that the plug of elastomeric material 72 is subjected almost exclusively to shear stress only.

Thus it can be seen that the base 30 has a vibrationally isolated internal frame 55 across which the carriage assembly 36 may be mounted. As best seen in FIGURE 1 the unitary driving means 38 is positioned transversely of the side tracks 60. Therefore the vibrations produced by the unitary driving means 38 will be transferred to the internal frame 55 and then effectively absorbed by the resilient connecting means 63. Hence vibrations generated by the driving means 38 do not interfere with the vibrations of a rotor 44 which is under dynamic observation in the apparatus.

(III) *The Balancing Support Stands 32*

Referring in particular to FIGURES 2 and 3, each of the balancing support stands 32 comprise a body 76 having a base element 77 and inclined side elements 78 connected thereto by means of gusset plates 79. The base element 77 and the side elements 78 preferably comprise lightweight C-shaped channel members.

The body 76 further includes a pair of balancing stand clamps 80 which slideably secure the balancing stands 32 to the side rails 56. Referring in particular to FIGURES 2 and 7, the balancing stand clamps 80 each include a mounting block 81 secured to the web portion of the base element 77 by means of bolts 82. An outer jaw 83 engages one side of the mounting block 81 and a portion of the side rail 56. An inner jaw 84 comprises an L-shaped member having a horizontal leg 84a and a vertical leg 84b. The horizontal leg 84a is engaged with the lower face of the horizontal upper flange 66. The vertical leg 84b includes spacer means such as set screw 85 for maintaining the leg 84a substantially horizontal for engagement with the horizontal upper flange 66. The clamp 80 also includes a pair of clamping bolts 86 which extend through the outer jaw 83 and the mounting block 81 and are threadedly engaged in the vertical leg 84b.

Thus by loosening the pair of clamping bolts 86 on each of the stand clamps 80, the balancing support stands 32 are free to be positioned longitudinally along the side rails 56.

Referring again to FIGURES 2 and 3, each of the balancing support stands 32 further includes the novel extensible rotor support 34 positioned within the body 76. The extensible rotor support 34 includes a pair of vertical flexible reeds 88 which carry support means 89. The support means 89 comprises a cradle 90, and a rotor retainer 92. As shown the cradle 90 and the rotor retainer 92 cooperate to support and retain the bearing 48 (hence the rotor 44) in fixed longitudinal relation with the extensible rotor support 34. Further the support means 89 maintains the rotational axis 50 of the rotor 44 substantially horizontal. The rotor 44 is thus free to rotate in its own bearings 48 about the rotational axis 50.

Illustrated in FIGURE 3 is a vibrations transducer 93 which serves to convert the mechanical vibrations of the rotor 44 into electrical signals. Any suitable vibrations transducer may be used. For example, the transducer disclosed in U.S. Patent 2,754,435, by T. Ongaro, assigned to the assignee of the present invention.

Preferably the vibrations transducer 93 is secured to the upper end of the extensible rotor support 34. Alternatively a vibrations transducer 93' (shown in phantom outline) may be secured to the cradle 90. An explanation of the double positioning of the transducer will follow later in this specification.

Although the support means 89 has been specifically illustrated, it should be evident that it may comprise any suitable structure. For example, the cradle structure of U.S. Patent 2,812,457 by A. R. Crawford, assigned to the assignee of the present invention. Further any suitable rotor retainer could be used.

A damping means 94 extends between and is secured to one of the the side elements 78 and to the extensible rotor support 34 of one of the balancing support stands 32 as shown in FIGURE 3 and hereinafter discussed in detail in reference to FIGURE 15.

(III-A) *The Extensible Rotor Support 34*

The extensible rotor support 34 will now be described with reference to FIGURES 8 to 14 inclusive.

Referring in particular to FIGURES 8 and 9, the extensible rotor support 34 generally includes the pair of vertical flexible reeds 88, an upper support plate 100, a lower support block 101, a vertically slideable extension member 102, unitary clamping and locking means 103 and adjustment means 104.

Each of the flexible reeds 88 preferably comprises a reed having a substantially uniform spring constant in all directions of bending. Further, the flexible reeds 88 should have sufficient column strength in order to support the weight of the rotor that is to be balanced. Steel rods which have a circular cross section possess these characteristics. Thus the flexible reeds 88 preferably comprise steel rods having a circular cross section, as for example drill rod.

It should be evident then that a proper choice of physical properties and of diameter will result in a flexible reed having the desired spring constant and sufficient column strength. It is also preferable that the flexible reeds 88 both have substantially the same column strength and spring constant.

In FIGURES 8 and 9, the upper support plate 100 and the lower support block 101 extend transversely across the flexible reeds 88 and serve to maintain the flexible reeds 88 in spaced, substantially parallel relationship. The flexible reeds 88 have threaded upper ends 105 which are screwed into threaded holes 106 in the upper support plate 100 and locked therein by means of lock nuts 107.

As best seen in FIGURE 10, the lower support block 101 comprises a split body clamp structure including block half 101a and block half 101b with abutting faces 108a and 108b. Each of the faces 108a, 108b includes a pair of semicircular grooves 109a and 109b respectively, which are formed by drilling a pair of holes having their center on the juncture of the abutting faces 108a and 108b.

The lower support block 101 further includes a pair of clamping bolts 110 and nuts 111. The bolts 110 extend longitudinally through the block halves 101a, 101b and the abutting faces 108a, 108b and cooperate with the nuts 111 to clamp the pair of flexible reeds 88 in the grooves 109a, 109b.

Thus the flexible reeds 88, the upper support plate 100 and the lower support block 101 comprise a unitary structure. The flexible reeds 88 may be replaced to obtain a structure having different spring constants and different load carrying capacities. The reeds 88 may be interchanged simply by loosening the clamping bolts 110 to release the lower ends of the reeds, then unscrewing the upper ends 105 from the upper support plate 100. Substituting a new pair of flexible reeds produces a new flexible rotor support having a different spring constant and a different column strength. It should be evident that the present rotor support alternatively may incorporate more than two coplanar flexible reeds in order to vary the spring constants and the column strength of the support.

As best seen in FIGURE 8 the lower support block 101 is secured to the web portion of the base element 77 by means of bolts 112 and nuts 113. Specifically the lower support block 101 is secured at a point centrally of the ends of the base element 77 with the pair of flexible reeds substantially vertical to and aligned transversely of the base element 77.

A vertically slideable extension member 102, as shown in FIGURES 8 and 9, comprises a threaded tubular member. The extension member 102 is maintained intermediate of and substantially parallel to the flexible reeds 88 and includes an upper end 114 and a lower end 115.

The cradle 90 includes a spacer block 116 having a central threaded hole 117 therethrough. The upper end 114, of the extension member 102, is threadedly engaged in the central hole 117 and locked therein by means of a nut 118. The support means 89 is thereby secured to the upper end 114 of the extension member 102.

The unitary clamping and locking means 103, as best seen in FIGURE 11, comprises a plate 119 including a first side 120 and a second side 121. The plate 119 is positioned transversely across the pair of flexible reeds 88 and the extension member 102. The plate 119 also includes clamping means 103a and locking means 103b which means will now be described.

Clamping means 103a comprises a threaded central aperture 123 and a first cut 124 in the first side 120 which communicates with the central aperture 123. The lower end 115 of the extension member 102 is threadedly engaged in the central aperture 123 and thereby rotatably retained therein. Further a clamping fastener such as bolt 125 extends longitudinally through the plate 119 and the first cut 124 and cooperates with a nut 126 to non-rotatably clamp the extension member 102 in the central aperture 123.

Thus, clamping means 103a serves to clamp the extension member 102 to maintain the support means 89 in non-rotating relation with the pair of vertical flexible reeds 88. Flrther, the weight of a rotor mounted on support means 89 causes the cradle 90 to be transversely aligned with the rotor when the clamping means 103a is loosened, i.e., the extension member 102 rotates in the proper direction to permit transverse alignment of the cradle 90.

Locking means 103b comprises a pair of guide holes 129 which receive the flexible reeds 88 and second cuts 130 in the second side 121 each communicating with one of the guide holes 129. Further, a locking fastener such as bolt 131 extends longitudinally through the plate 119 and the second cuts 130 and cooperates with a nut 132 to frictionally clamp the pair of flexible reeds 88 in the guide holes 129. Thus locking means 103b provides means for locking the extension member 102 in fixed longitudinal relation with the pair of flexible reeds 88.

The preferred embodiment of the adjustment means 104 is illustrated in FIGURES 8, 9 and 12 and includes a bevel gear 136, a pinion gear 137 and a pinion block 138.

The bevel gear 136 is journaled on the upper support plate 100 by means of a sleeve bearing 139. A central threaded bore 140 extends through the bevel gear 136. The extension member 102 extends through the central threaded bore 140 and is threadedly engaged therein.

The pinion gear 137 is journaled on the pinion block 138 by means of sleeve bearing 141. The pinion block 138 is secured on one side of the support plate 100, by means of bolts 142, in such a manner that the pinion gear 137 is maintained in meshing relation with the bevel gear 136. The pinion gear 137 further includes a pinion gear bolt 143 which serves as a means for turning the pinion gear 137.

It should be evident that the extension member 102, the unitary clamping and locking means 103 and the adjustment means 104 provide apparatus by which the length of the rotor support 34 may be varied. Of course, when the length of the rotor support 34 is varied, its natural frequency also yaries. Therefore when a rotor's imbalance excites the rotor support 34 to vibrate at its natural frequency, the length of the rotor support 34 may be varied conveniently to provide a different natural frequency.

To adjust the length of the rotor support 34, the nut 132 is loosened thus relieving the clamping restraint on the flexible reeds 88. A wrench is applied to the pinion gear bolt 143 to turn the pinion gear 137 and hence the bevel gear 136. Depending on the direction in which the bevel gear 136 turns, the extension member 102 will ride up or down on the threads of the central threaded bore 140 of the bevel gear 136. Illustrated in phantom outline, in FIGURE 9, are the cradle 90' and the plate 119' in their extreme vertically adjusted position. The length of adjustment is indicated by the bracket and designated by the letter A.

When the length of the rotor support 34 has been properly adjusted the bolt 131 and nut 132 are tightened to effect clamping of the flexible reeds 88 in the guide holes 129. Preferably the pinion gear bolt 143 is forcefully turned in the proper direction to place in tension that portion of the extension member 102 which extends between the plate 119 and the upper support plate 100.

The extensible rotor support 34 is adapted to the base element 77 of the body 76, as hereinbefore described, by having the lower support block 101 secured at a point centrally of the ends of the base element 77 by means of the plurality of bolts 112 and nuts 113.

It should be noted that the pairs of vertical flexible reeds 88, the vertically slideable extension member 102 and the rotational axis 50 of the rotor 44 lie substantially in the same plane, as clearly shown in FIGURES 2 and 3.

Further, as can be seen in FIGURE 3, the flexible reeds 88 may undergo transverse bending with respect to the rotational axis 50. Still further, as can be seen in FIGURE 2, the flexible reeds 88 may undergo longitudinal bending with respect to the rotational axis 50. However, the longitudinal bending is restrained substantially twice as much as the transverse bending, i.e., transverse bending requires the bending of the reeds 88 only adjacent the lower support block 101 (see FIGURE 8) while longitudinal bending requires the bending of the reeds 88 adjacent the lower support block 101 and adjacent the plate 119 (see FIGURE 9).

It also should be evident that the flexible reeds 88 will experience torsion or twisting. The combined effect of transverse bending, longitudinal bending and the twisting of the reeds 88 results in:

(1) Maintaining the rotational axis of a supported rotor substantially horizontal, and (2) Maintaining a constant longitudinal spacing of the journals 48 of the supported rotor 44.

Therefore the rigidly retained journals of a supported rotor are never misaligned with respect to the rotational axis of the rotor.

As hereinbefore mentioned a proper choice of the physical properties and the diameter of the flexible reeds 88 results in any desired spring constant and load supporting capacity. Likewise the proper spacing of the pair of flexible reeds 88 will result in a structure having a specific torsional spring constant. Hence an extensible rotor support may be constructed wherein the spring constants for transverse and longitudinal bending and the torsional spring constant have been predetermined.

Referring again to FIGURE 3, the preferred position of the vibration transducer 93 is on the upper support plate 100. However, when the amplitude of the vibrations at the upper support plate 100 becomes less than the sensitivity of the transducer, the transducer may be positioned on the cradle 90 as indicated by the transducer 93' (in phantom outline). By relocating the transducer at a higher point above the lower support block 101, the transverse bending of the reeds 88 is amplified thus increasing the amplitude of the measured vibrations. The adjustment means 104 also may be used to further elevate the support means 89 (hence the transducer 93') with a further amplification of the rotor vibrations.

An alternative embodiment of the adjustment means is illustrated in FIGURE 13 and designated by the numeral 104'. In this instance a T-nut 144 is rotatably retained in the upper support plate 100. The T-nut 144 includes a central threaded opening 145 through which the extension member 102 extends in threaded engagement therewith. The vertical adjustment of the extension member 102 requires the release of the locking means 103b (as in the preferred embodiment). Using a wrench or the like, the T-nut 144 is turned. Depending on the direction in which the T-nut 144 is turned, the extension member 102 rides up or down on the threads of the central threaded opening 145. Illustrated in phantom outline, in FIGURE 13, are the cradle 90' and the plate 119' in their extreme vertically adjusted position. The length of adjustment is indicated by the bracket and designated by the letter A'.

Having vertically adjusted the extension member 102, the locking means 103b is tightened (as in the preferred embodiment) and the T-nut 144 is forcefully turned in the proper direction so as to place in tension that portion of the extension member 102 which extends between the plate 119 and the upper support plate 100.

It should be noted that the extensible rotor support 34 has utility apart from the specific balancing stand 32 and the base 30.

Attention is now directed to FIGURE 14. There is illustrated a rotor 160 having a shaft 161 and a terminal mass 162 which comprises a major portion of the rotor's weight. The rotor 160 is supported by a pair of extensible rotor supports 34 one of which includes a first pair of flexible reeds 88a and support means 89a and the other of which includes a second pair of flexible reeds 88b and support means 89b.

As shown in FIGURE 14 the terminal mass 162 is cantilevered from the first pair of flexible reeds 88a. Thus its weight W has a line of action indicated by the downwardly directed arrow 163. Further the weight W creates a moment M, about the support means 89a, having a line of action indicated by the arcuate arrow 164. The first pair of flexible reeds 88a supports the entire weight W of the terminal mass 162 and hence the weight of the entire rotor. Further, the second pair of flexible reeds 88b serves only to counteract the moment M created by the cantilevered terminal mass 162. Therefore the first pair of flexible reeds 88a is under a compressive load while the second pair of flexible reeds is under a tension load.

Reference is now directed to FIGURE 24 wherein an alternative embodiment of the present rotor support is schematically illustrated. In this embodiment flexible reeds 88' include a peripheral groove 165 adjacent to its lower end. Each peripheral groove 165 has an axial length, indicated at 166, and a reduced diameter, indicated at 167. The axial length 166 and the reduced diameter 167 are factors in the determination of the transverse and longitudinal spring constants as well as the torsional spring constant. Thus the provision of the peripheral grooves 165 is a further means by which the transverse, the longitudinal and the torsional spring constants may be varied.

An object of this invention is to provide a balancing support stand that may be used in pairs to support relatively large rotors and singularly to support relatively small rotors. In FIGURE 25 the singular use of the present rotor support 34 is schematically illustrated. In this instance a relatively small rotor 240 includes a thin shaft 241 journaled within a housing 242. The rotor 240 is centrally supported by a single extensible rotor support 34 and retained thereon by means of the rotor retainer 92. Further, pickups 243 such as the vibration transducer 93 (hereinbefore described) are mounted on the opposed ends of the housing 242 by any suitable means. The drive belt 42 is also shown in driving contact with the thin shaft 241.

As illustrated the housing 242 presents a relatively large mass in comparison to the thin shaft 241. A nonrotating mass, such as the housing 242, is known as a "parasitic mass." When the parasitic mass is large in comparison with the rotating mass (the thin shaft 241) it tends to dampen any vibrations introduced by the rotating mass. Hence, the balancing of these structures requires an extremely sensitive support. The extensible rotor support 34 is especially adaptable in balancing these structures because of its ability to be set into vibration by these minute forces.

(III-B) *The Damping Means 94*

The damping means 94, as shown in FIGURES 3 and 15 comprises a pair of spaced apart elastomers 147a, 147b, a rigid connecting conduit 148 and fastener elements such as bolts 149a, 149b.

The rigid connecting conduit 148 has one of the elastomers 147a, 147b secured within each of its ends. The bolts 149a, 149b extend centrally through the elastomers 147a, 147b, respectively. The bolt 149b secures the elastomer 147b to an angle member 150 which is secured to the side element 78. The other bolt 149a secures the elastomer 147a to the upper support plate 100 of the flexible reeds 88.

Specifically each of the elastomers 147a, 147b comprises a plug of resilient material 151 having an external surface 152 and an internal surface 153 defined by the bore of a central opening 154. Each of the elastomers 147 further includes a rigid internal tubular member 155 and a rigid external tubular member 156. The internal member 155 extends through the central opening 154 and has its outer surface bonded to the internal surface 153. The external member 156 is peripherally engaged with and bonded to the external surface 152. The external member 156 is retainably housed within one end of the rigid connecting conduit 148 so that at least one end of the internal tubular member 155 projects beyond the end of the connecting conduit 148. Thus the connecting conduit 148 serves to maintain the external member 156 of each elastomer 147 in axially aligned relation.

The connecting conduit 148 also has diametrically opposed slots 157 (only one shown) in each of its ends. A peripheral strap 158 serves to clamp each of the elastomers 147 in each end of the connecting conduit 148.

Preferably the damping means 94 is positioned substantially perpendicular to the plane of the pair of flexible reeds 88. The damping means 94 serves to dampen undesired vibrations having a low frequency and a large amplitude without seriously affecting the high frequency, low amplitude vibrations of the rotor 44.

It should be evident, from the foregoing description, that the damping means 94 is longitudinally compressible thereby dampening the undesired vibrations. Further, by virtue of its construction, the damping means 94 does not interfere with the transverse, longitudinal or torsional bending of the flexible reeds 88. This should be evident since the internal tubular members 155 are rigidly secured to the upper support plate 100, in the case of the elastomer 147a, and to the angle member 150, in the case of the elastomer 147b. The external tubular members 156 are rigidly axially aligned by means of the connecting conduit 148 and each resiliently secured to one of the internal members 155. Thus the internal member 155 of the elastomer 147a may be displaced about an arcuate locus lying in a plane normal to the longitudinal aixs of the internal member 155 while at the same time it may be longitudinally displaced with respect to its longitudinal axis. In other words the internal member 155 (of the elastomer 147a) and the upper support plate 100 are displaceable as a unit under the vibratory action of driven rotor.

(IV) *The Carriage Assembly 36*

The carriage assembly 36 will now be described with reference to FIGURES 16 to 22 inclusive.

As hereinbefore mentioned, the carriage assembly 36 is resiliently supported by the base 30 and includes the cradle frame 37, the unitary driving means 38, the driving belt guide means 40 and the drive belt 42.

(IV–A) *The Cradle Frame 37*

The cradle frame 37 is illustrated in FIGURES 16 and 17 and comprises a pair of spaced apart parallel side ribs 170 extending between the side tracks 60 and end plates 171 extending between and secured to the adjacent ends of the side ribs 170.

The cradle frame 37 also includes cradle support rollers 172 one each being journaled on the ends of the side ribs 170 and overlying and engaged with the upper face of the platform 68. Each support roller 172 has a radial flange 173 which engages the extreme inner side edge of the platform 68 to thereby guide the cradle frame 37 along the side tracks 60.

The cradle frame 37 further includes cradle clamp means 174 comprising a cradle support tab 175 having one end secured to the end plate 171 by means of the bolt 176 and the other end overlying the platform 68. Cradle clamp means 174 further includes a clamping fastener 177 which extends through the tab 175 intermediate of its ends and is threadedly engaged in the end plate 171. A side portion 178 of the end plate 171 projects beneath the platform 68. As shown in FIGURE 16, the cradle clamp means 174 is in an unclamped position. The cradle support rollers 172 thus support the cradle frame 37 for longitudinal movement along the tracks 60.

Reference is now directed to FIGURE 18 wherein the cradle clamping means 174 is illustrated in a clamped position. The clamping fastener 177 is turned down until the tab 175 engages the upper face of the platform 68. Further turning of the clamping fastener 177 causes the upward displacement of the entire carriage assembly 36 until the side portion 178 of the end plate 171 engages the lower face of the platform 68. The cradle support tab 175 cooperates with the side portion 178 to releasably clamp the platform 68 therebetween.

Further the cradle support rollers 172 are also displaced upwardly and are now in overlying spaced apart relation with the platform 68. Thus the support tabs 175 comprise the sole support for the cradle frame 37 when the cradle frame 37 is clamped to the side tracks 60.

Hence the cradle frame 37 can be conveniently fastened at any desired position along the length of the platforms 68 by loosening the clamping fasteners 177, rolling the cradle frame 37 on the rollers 172 to the new location and tightening the clamping fasteners 177.

IV–B *The Unitary Driving Means 38*

The unitary driving means 38 is illustrated in FIGURES 16, 17, 19, 20 and 21 and generally includes a carrier frame 180, actuating means 181 and a jackshaft brake assembly 182.

The carrier frame 180 is releasably clamped to and positionable along the side ribs 170 of the cradle frame 37. The carrier frame 180 comprises coplanar first and second mounting plates 183, 184, a connector plate 185, clamping plates 186, 187 and aligned carrier frame support rollers 188.

The actuating means 181 comprises a variable speed drive motor 189 having a shaft 190 with a drive pulley 191 secured thereto.

Referring to FIGURES 16 and 17 the connector plate 185 includes a slot 192 cut longitudinally therein and adjacent one end. A connector plate fastener 193 extends through the slot 192 and is threadedly engaged in the first mounting plate 183. Thus the connector plate 185 has one end slideably secured to the first mounting plate 183.

Referring to FIGURE 19, the drive motor 189 is secured to the first mounting plate 183 by any suitable means such as bolts 194. The first mounting plate 183 extends between and below the side ribs 170 with its ends engaged with the lower face of the side ribs 170. The clamping plate 186 extends between and over the side ribs 170 with its ends engaged with the upper face of the side ribs 170. The clamping plate 186 is secured only to the first mounting plate 183 by means of bolts 195 which extend through the clamping plate 186 and are threadedly engaged with the first mounting plate 183.

The clamping plate 186 overlies the connector plate 185 and includes a clearance hole 196 which annularly disposed with respect to the connector plate fastener 193. The clearance hole 196 is large enough to permit a socket wrench or the like to be used in loosening and tightening the connector plate fastener 193.

As shown the adjacent ends of the first mounting plate 183 and the connector plate 186 releaseably clamp therebetween a portion of the side ribs 170.

Referring to FIGURE 21, the jackshaft brake assembly 182 includes a tubular member 197 which is secured to the second mounting plate 184 by means of jackshaft support blocks 198 and bolts 199 which extend through the jackshaft support blocks 198 and are threadedly engaged in the second mounting plate 184. The second mounting plate 184 is secured to the other end of the connector plate 185 by means of bolts 200. The second mounting plate 184 extends between and below the side ribs 170 with its ends engaged with the lower face of the side ribs 170. The clamping plate 187 extends between and above the side ribs 170 with its ends engaged with the upper face of the side ribs 170. The clamping plate 187 is secured only to the second mounting plate 184 by means of bolts 201 which extend through the clamping plate 187 and are threadedly engaged with the second mounting plate 184.

As shown the adjacent ends of the second mounting plate 184 and the clamping plate 187 releaseably clamp therebetween a portion of the side ribs 170.

The jackshaft brake assembly 182 further includes a journaled shaft 203 housed within the tubular member 197. End portions 204, 205 of the journaled shaft 203 extend beyond the side ribs 170. Further a driven pulley 206 is secured to the end portion 204 and a driving pulley 207 is secured to the end portion 205. The jackshaft brake assembly 182 further includes electromagnetic brake means 208 associated with the journaled shaft 203 for decelerating a rotor. The jackshaft brake assembly 182 and an improvement therein will be described in detail, later in the specification, in conjunction with FIGURE 23.

As can be seen in FIGURE 21, the journaled shaft 203 has a longitudinal axis 210 which extends transversely of the side ribs 170. As can be seen in FIGURE 19, the actuating means 181 also has a longitudinal axis 211 which extends transversely of the side ribs 170.

Referring again to FIGURE 16, the unitary driving means 38 includes a timing belt 212 which is engaged in driving relation with the drive pulley 191 and the driven pulley 206. The longitudinal axis 211 of the actuating means 181 is spaced from and substantially parallel to the longitudinal axis 210 of the journaled shaft 203. By releasing the clamping plate 187 and by loosening the connector plate fastener 193, the jackshaft brake assembly 182 may be moved so as to adjust the tension in the timing belt 212.

As hereinbefore stated, the actuating means 181 comprises the variable speed motor 189. Alternatively a constant speed motor may be used with the drive pulley 191 and/or the driven pulley 206 being interchanged from time-to-time as desired, with pulleys having different diameters thereby effecting a variable driving speed. Alternatively a V-belt may be used in place of the timing belt 212.

As hereinbefore mentioned, the carrier frame 180 is positionable along the side ribs 170 of the cradle frame 37. To this end reference is now directed to FIGURES 19 and 20, wherein the aligned carrier frame support rollers 188 are best illustrated. The carrier frame support rollers 188 are shown journaled to the first mounting plate 183 on opposed sides of the connector plate 185. Each of the support rollers 188 is in overlying spaced apart relation with the upper face of the side ribs 170 when the carrier frame 180 is clamped to the side ribs 170. However, when the clamping plates 186 and 187 have been released, the support rollers 188 engage the upper face of the side ribs 170, as shown in FIGURE 20. Thus the carrier frame 180 may be positioned at any desired location along the side ribs 170 of the cradle frame 37 by loosening the connector plate fastener 193, sliding the carrier frame 180 along the support rollers 188 over the side ribs 170 to the desired location and thereafter tightening the connector plate fastener 193 once again.

(IV–C) *The Drive Belt Guide Means 40*

The drive belt guide means 40 is illustrated in FIGURES 16, 17 and 22 and generally comprises positionable support arms 215, 216, guide pulleys 217, 218, and a fixed guide pulley 219.

Referring in particular to FIGURE 16 each of the support arms 215, 216 has a support shaft 220, 221 respectively secured perpendicular to one end. The support shaft 220 is clampably journaled by means of journal blocks 222 to the adjacent ends of the side ribs 170, on one side of the cradle frame 37. The support shaft 221 is also clampably journaled by means of journal blocks 223 to the other adjacent ends of the side ribs 170, on the other end of the cradle frame 37. The guide pulleys 217 and 218 are rotatably secured to the other end of the support arms 215 and 216 respectively. The guide pulleys 217 and 218 are thus individually positionable about an arcuate locus. The fixed guide pulley is rotatably secured to one end of the support arm 215 and axially aligned with the support shaft 220.

For a better understanding of the drive belt guide means 40, attention is now directed to FIGURE 22. As seen herein the fixed guide pulley 219 is positioned on one side of the actuating means 181 and the driving pulley 207, of the jackshaft brake assembly 182, is positioned on the other side of the actuating means 181. Since the driving pulley 207 can be positioned at different distances from the fixed guide pulley 219, there is provided a means for taking up slack in and for applying tension to the drive belt 42.

As hereinbefore mentioned the guide pulleys 217, 218 are separately positionable about an arcuate locus, as illustrated by the dot-dash lines designated by the letters B and C in FIGURE 22.

The rotor shaft 46 is shown with the drive belt 42 engaged thereon in driving relation. The drive belt 42 extends downwardly between the guide pulleys 217, 218 and engaged therewith. The drive belt 42 has one side extending toward and around the fixed guide pulley 219 and the other side extending toward and around the driving pulley 207. The drive belt 42 is now in position for driving the rotor shaft 46 and hence the rotor with which it is associated.

It should be evident from the above that the guide pulleys 217, 218 function not only to guide the drive belt 42 but also to govern the amount of peripheral contact between the drive belt 42 and the rotor shaft 46. Preferably the peripheral contact should exceed one-half the circumference of the rotor shaft 46. Further the guide pulleys 217, 218 should be positioned substantially equidistant from the plane in which the flexible reeds 88 and the rotational axis 50 lie, i.e., so that there is no unbalance force acting upon the rotor shaft 46 in either direction.

It should also be evident that once the preferred peripheral contact has been established, further lowering of the guide pulleys 217, 218 serves as an additional means by which tension may be applied to the drive belt 42.

Also illustrated in FIGURE 22 is another driving arrangement. The support arms 215', 216', the guide pulleys 217', 218', the driving pulleys 204' and the drive belt 42' are illustrated in phantom outline in their new positions. In this instance the drive belt 42' is in peripheral contact with a relatively large rotor shaft 225 of which only a portion is shown in phantom outline. The rotor shaft 225, the guide pulley 217' and the driving pulley 207' engage the inner surface of the drive belt 42' while the guide pulley 218' engages the outer surface of the drive belt 42'. The fixed guide pulley 219 is not used in this driving arrangement.

When using either of the above described driving arrangements, it may become necessary to raise or lower the support means 89 (not shown) for leveling the rotor or for changing the natural frequency of the extensible rotor support means 34 (not shown).

When the first above described driving arrangement is used, i.e., utilizing the pulleys 207, 217, 218 and 219, the lowering of the support means 34 induces slack in the drive belt 42. This slack may be taken up by lowering the guide pulleys 217 and 218. Notice that the preferred peripheral contact still may be maintained. Conversely, when the support means 89 is raised to any great extent, additional belt length is required. To overcome this situation, the relative positions of the guide pulleys 217, 218 and the driving pulley 207 are so adjusted whereby the guide pulleys 217, 218 may be raised while still maintaining the preferred peripheral contact. Should additional belt length still be required, the driving pulley 207, hence the unitary driving means 38, may be moved in the proper direction.

When using the second above described driving arrangement, i.e., utilizing the pulleys 207', 217' and 218', the lowering of the support means 34 induces slack in the drive belt 42'. This slack may be taken up by lowering the guide pulleys 217', 218'. Notice that the preferred peripheral contact still may be maintained. Conversely, when the support means 34 is raised to any great extent, additional belt length is required. To overcome this situation, the relative positions of the guide pulleys 217', 218' and the driving pulley 207' are so adjusted whereby the guide pulleys 217' and 218' may be raised while still maintaining the preferred peripheral contact. Should additional belt length still be required, the driving pulley 207', hence the unitary driving means 38, may be moved in the proper direction.

It should be evident from the foregoing that the present invention provides a versatile drive belt guide means that uses a single belt length to drive rotors having different drive diameters. Further the present invention provides a versatile drive belt means that uses a single belt length to drive rotors at different elevations above the drive motor. Still further the present invention provides a carriage assembly supporting a high speed drive means and a drive belt guide means, which carriage assembly is positionable along the base of the assembly to drive a rotor from any convenient plane of the rotor, i.e., in outboard relation with any of the rotor supports, as illustrated in FIGURES 1 and 2, or intermediate of the rotor supports.

The unitary structure of the present invention comprising the base 32 and the carriage assembly 36 can be utilized with balancing support stands other than the present balancing support stand 32. As for example the stands disclosed in U.S. Patents Re. 23,784, 2,656,710, 1,347,316, 2,696,108, 2,186,339, 2,722,465, 2,412,473, 2,754,686, 2,457,718, 2,785,572, 2,857,764.

(V) *The Jackshaft Brake Assembly 182*

The present invention contemplates the use of an improved jackshaft brake assembly 182 which is illustrated in detail in FIGURE 23.

As hereinbefore described, the jackshaft brake assembly 182 includes a tubular member 197 which is secured to the second mounting plate 184 by means of jackshaft support blocks 198 and bolts 199 which extend through the support blocks 198 and are threadedly engaged in the second mounting plate 184. The jackshaft brake assembly 182 further includes a journaled shaft 203 housed within the tubular member 197 and whose end portions 204, 205 extend beyond the ends of the tubular member 197 and the side ribs 170. Further a driven pulley 206 is secured to the end portion 204 and a driving pulley 207 is secured to the end portion 205. The jackshaft brake assembly also includes electromagnetic brake means 208 associated with the journaled shaft 203 for decelerating the shaft 203, hence the rotor 44.

As can be seen in FIGURE 23, the journaled shaft 203 is rotatably supported by and axially slideable on bearing elements 230 one each retained within each end of the tubular member 197.

The electromagnetic brake means 208 includes an electromagnetic friction clutch 231 and an armature or pressure plate 232. The electromagnetic friction clutch 231 may comprise any suitable type, for example, that clutch illustrated in U.S. Patent 2,971,672.

The electromagnetic friction clutch 231 generally comprises a clutch housing 233 serving as a pole piece, a sleeve pole piece 234, an annular friction member 235 and an annular electric coil or field magnet 236.

The annular field magnet 235 is housed within the pole pieces 233, 234 and the annular friction member 235 and is concentrically disposed with respect to the shaft 203. The annular friction member 235 lies in a plane normal to the longitudinal axis 210 of the shaft 203.

The pressure plate 232 includes a face 237 which lies in another plane normal to the longitudinal axis 210 of the shaft 203. The face 237 is spaced from and adapted to frictionally engage the annular friction member 235 under the magnetic influence of the annular field magnet 235. In this manner a rotor being driven by the driving pulley 207 by way of the drive belt 42 (not shown) may be decelerated when the drive motor 189 is stopped.

In prior art jackshaft brake assemblies, the pressure plate was retained on the shaft, for engagement with the annular friction member, by two methods. In one instance the shaft and the pressure plate included cooperating splines which permitted the pressure plate to move into and out of engagement with the annular friction member. In another instance a plurality of rods, projecting through the pressure plate, were utilized to guide the pressure plate into and out of engagement with the annular friction member. In both instances, however, the pressure plate could not be mounted in closely fitting engagement with the guide means (the splines or the rods) and still permit the pressure plate to move into and out of engagement with the annular friction member. Therefore the pressure plate could not be dynamically balanced in the jackshaft assembly in order to minimize the rotational vibrations associated therewith.

In the present invention the pressure plate 232, the shaft 203, the driven pulley 206 and the driving pulley 207 comprise a unitary structure 238. Further the pressure plate 232 is spaced from the annular friction member 235 as indicated at D. Thus under the influence of the annular field magnet 236, the pressure plate 232, hence the unitary structure 238, is pulled into frictional engagement with the annular friction member 235.

The improvement in the jackshaft brake assembly 182 comprises the unitary structure 238, i.e., the securing of the pressure plate 232 to the shaft 203. Since the pressure plate 232 is secured to the shaft 203, it may be statically and dynamically balanced to minimize the rotational vibrations associated with jackshaft brake assemblies of this type.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:

1. In a balancing stand for determining the imbalance of a rotor, the combination comprising:
   a pair of vertical flexible reeds, each having a fixed end secured to a base and a free end, said pair of flexible reeds extending from the said base in spaced substantially parallel relationship;
   a vertical extension member connected to the free ends of said pair of flexible reeds and maintained intermediate of and substantially parallel to the said pair of flexible reeds, said extension member being vertically slideable beyond the free ends of said pair of flexible reeds whereby the length of said balancing stand may be adjusted; and
   a single support means secured to the said extension member for maintaining the rotational axis of a rotor substantially horizontal;
   said pair of flexible reeds, said vertical extension member and the said rotational axis of the said rotor lying substantially in the same plane;
   said rotor being free to rotate about the said rotational axis whereby the imbalance of said rotor causes the said flexible reeds to flex as a unit about their fixed ends.

2. In a balancing stand for determining the imbalance of a rotor, the combination comprising:
   a pair of vertical flexible reeds, each having a fixed end secured to a base and a free end, said pair of flexible reeds extending from the said base in spaced substantially parallel relationship;

a vertical extension member connected to the free ends of said flexible reeds and maintained intermediate of and substantially parallel to the said pair of flexible reeds, said extension member being vertically slideable beyond the free ends of said pair of flexible reeds whereby the length of said balancing stand may be adjusted;

a single support means secured to the said extension member for maintaining the rotational axis of a rotor substantially horizontal;

adjustment means for longitudinally positioning the said extension member with respect to the said pair of flexible reeds; and means for locking the said extension member in fixed longitudinal relation with the said pair of flexible reeds;

said pair of flexible reeds, the said extension member and the said rotational axis of the said rotor lying substantially in the same plane;

said rotor being free to rotate about the said rotational axis whereby the imbalance of the said rotor causes the said flexible reeds to flex as a unit about their fixed ends.

3. The combination of claim 2 including means for clamping the said extension member to maintain the said support means in non-rotating relation with the said pair of flexible reeds.

4. In a balancing stand for determining the imbalance of a rotor, the combination comprising:

a pair of vertical flexible reeds, each having a fixed end secured to a base and a free end, said pair of flexible reeds extending from the said base in spaced substantially parallel relationship;

a vertical extension member connected to the free ends of said flexible reeds and maintained intermediate of and substantially parallel to the said pair of flexible reeds, said extension member being vertically slideable beyond the free ends of the said pair of flexible reeds whereby the length of said balancing stand may be adjusted;

a single support means secured to the said extension member for maintaining the rotational axis of a rotor substantially horizontal;

adjustment means for longitudinally positioning the said extension member with respect to the said pair of flexible reeds; and unitary means for clamping the said extension member to maintain the said support means in non-rotating relation with the said pair of flexible reeds and for locking the said extension member in fixed longitudinal relation with the said pair of flexible reeds;

said pair of flexible reeds, the said extension member and the said rotational axis of the said rotor lying substantially in the same plane;

said rotor being free to rotate about the said rotational axis whereby the imbalance of the said rotor causes the said flexible reeds to flex as a unit about their fixed ends.

5. The combination of claim 4 wherein the said unitary means comprises:

a plate positioned transversely across the extension member and the said pair of flexible reeds, a pair of guide holes in the said plate for receiving the said pair of flexible reeds, a central aperture in the said plate with the lower end of the said extension member being rotatably retained therein, a first cut through a first side of the said plate communicating with the said central aperture, second cuts through a second side of the said plate each communicating with one of the said guide holes, a clamping fastener extending longitudinally through the said plate and the said first cut for non-rotatably clamping the said extension member in the said central aperture, and a locking fastener extending longitudinally through the said plate and the said second cuts for frictionally clamping the said flexible reeds in the said guide holes.

6. The combination of claim 4 wherein the said extension member is an externally threaded tubular member and the said adjustment means comprises:

a support plate extending transversely across and secured to the upper ends of the said pair of flexible reeds, a bevel gear journaled on the said support plate, a central threaded bore in the said bevel gear, and a pinion gear maintained in meshing relation with the said bevel gear, said threaded tubular member extending through the said central threaded bore and in threaded engagement therein.

7. The combination of claim 4 wherein the said extension member is an externally threaded member and the adjustment means comprises:

a support plate extending transversely across and secured to the upper ends of the said pair of flexible reeds, a T-nut rotatably retained on the said plate, and a central threaded bore in the said T-nut, said threaded tubular member extending through the said central bore in threaded engagement therein.

8. In balancing apparatus for determining the imbalance of a rotor, the combination comprising:

a first pair of vertical flexible reeds, each having a fixed end secured to a base and a free end, said first pair of flexible reeds extending from the said base in spaced substantially parallel relationship;

a second pair of vertical flexible reeds, each having a fixed end secured to a base and a free end, said second pair of flexible reeds extending from the said base in spaced substantially parallel relationship; and a pair of support means for maintaining the rotational axis of a rotor substantially horizontal, one of said support means being rigidly secured to the free ends of said first pair of flexible reeds and the other of said support means being rigidly secured to the free ends of the said second pair of flexible reeds;

all of said flexible reeds and the rotational axis of the said rotor lying substantially in the same plane;

said rotor being free to rotate about the said rotational axis whereby the imbalance of said rotor causes the said first pair of flexible reeds to flex as a unit about their fixed ends and the said second pair of flexible reeds to flex as a unit about their fixed ends.

9. In balancing apparatus for determining the imbalance of a workpiece, the combination comprising:

a unitary balancing support stand and a workpiece;

said unitary balancing support stand comprising:
 a base;
 a pair of vertical flexible reeds, each having a fixed end secured to the said base and a free end, said pair of flexible reeds extending from the said base in spaced substantially parallel relationship;
 a single support means rigidly secured to the free ends of the said pair of flexible reeds for supporting the said rotor;

said workpiece comprising:
 a housing rigidly secured to and centrally supported by the said support means, said housing constituting a large parasitic mass, and
 a shaft journaled within said housing for rotation about a longitudinal rotational axis thereof, said support means maintaining the said rotational axis substantially horizontal, said shaft constituting a rotating mass which is relatively small when compared with the mass of said large parasitic mass;

said pair of flexible reeds and said rotational axis lying substantially in the same plane;

said pair of flexible reeds, said single support means and said workpiece comprising a unit which, upon rotation of the said shaft, the imbalance in said shaft causes the angular oscillations of said unit about a vertical axis positioned intermediate of and parallel to the said pair of flexible reeds.

10. In a balancing support stand for determining the imbalance of a rotor, the combination comprising:
a body including a base element and a pair of inclined side elements;
a support structure comprising:
a pair of vertical flexible reeds, each having a fixed end secured to the said base element and a free end;
said pair of flexible reeds extending from said base element in spaced, substantially parallel relationship;
a single support means rigidly secured to the free ends of the said pair of flexible reeds for maintaining the rotational axis of a rotor substantially horizontal, said rotor being free to rotate about the said rotational axis whereby the imbalance of said rotor causes the said flexible reeds to flex as a unit about their fixed ends;
said flexible reeds and the said rotational axis of the said rotor lying substantially in the same plane; and
damper means extending between the said pair of flexible reeds and one of the said inclined side elements;
said damper means comprising:
a pair of spaced apart elastomers;
a rigid connecting conduit having one of said elastomers retainably housed within each end in axially aligned relation; and
fastener elements one each extending centrally through each of the said elastomers for securing one of the said elastomers to one of the said inclined side elements and the other of the said elastomers to the said support structure.

11. The combination of claim 10 wherein the said damping means is positioned substantially perpendicular to the plane of said pair of flexible reeds.

12. The combination of claim 10 wherein each of the said elastomers comprises:
a cylindrical plug of resilient material,
a rigid internal tubular member bonded within the said resilient material, and
a rigid external tubular member bonded to the said resilient material.

13. The combination of claim 12 wherein said rigid external tubular members are axially aligned at all times.

14. The combination of claim 12 wherein one said rigid internal tubular member is displaceable as a unit with the said pair of flexible reeds under the vibratory action of the driven rotor.

15. In balancing apparatus for determining the imbalance of a rotor, the combination comprising:
an external frame including
a pair of side rails and
a pair of end members;
a rigid internal frame including
a pair of side tracks and
a pair of end members;
a plurality of unitary uncompressed resilient connecting members extending between adjacent end members of the said external frame and the said internal frame, said connecting means comprising the sole support of the said internal frame;
drive means secured to one said frame; and
balancing support stands secured to the other said frame.

16. The combination of claim 15 wherein each of the said connecting members comprises:
a pair of spaced apart bolts connected by means of a plug of elastomeric material.

17. In balancing apparatus for determining the imbalance of a rotor, the combination comprising:
an external frame including
a pair of side rails and
a pair of end members,
a rigid internal frame including
a pair of side tracks and
a pair of end members,
plurality of unitary uncompressed resilient connecting members extending between adjacent end members of the said internal frame and the said external frame,
said connecting means comprising the sole support of the said internal frame,
drive means secured to the said rigid internal frame, and
balancing support stands secured to the said external frame.

18. In balancing apparatus for determining the imbalance of a rotor, the combination comprising:
a base including
an external frame having a pair of side rails and a pair of end members,
a rigid internal frame having a pair of side tracks and a pair of end members,
uncompressed resilient connecting means extending between adjacent end members of the said internal frame and the said external frame, said connecting means comprising the sole support for the said internal frame;
a pair of rotor supports moveably secured on the said pair of side rails, one each rotatably supporting one end of a rotor whereby its rotational axis is maintained substantially horizontal;
a carriage assembly extending transversely between the said pair of side tracks, including
opposed ends one each releasably secured to one of the said side tracks whereby the said carriage assembly is positionable along the said pair of side tracks,
a drive belt guide means comprising:
a pair of guide pulleys,
a support arm for each of the said guide pulleys pivotally secured on one of said opposed ends whereby each of the said guide pulleys is positionable about an arcuate locus, and
unitary driving means including a driving pulley positionable between the said opposed ends, and
a drive belt frictionally engaged in driving relation with all of said pulleys and said rotor.

19. In a base and carriage assembly structure, the combination comprising:
a base including
an external frame having a pair of side rails and a pair of end members,
a rigid internal frame having a pair of side tracks and a pair of end members,
plurality of unitary uncompressed resilient connecting members extending between adjacent end members of the said internal frame and the said external frame, said connecting means comprising the sole support of the said rigid internal frame; and
a carriage assembly comprising
a cradle frame releasably clamped to and positionable along the said pair of side tracks,
unitary driving means releasably clamped to said cradle frame and positionable transversely between the said side tracks.

20. The combination of claim 19 wherein each of the side tracks includes an inwardly extended platform and said cradle frame comprises:
- a pair of spaced apart side ribs extending between the said pair of side tracks,
- end plates one each secured to the adjacent ends of the said side ribs,
- cradle clamp means on each of the said end plates for clamping the said cradle frame to the said platform, and
- cradle support rollers one each journaled to each end of the said side ribs in overlying spaced apart relation with the said platform,
- said cradle support rollers being engaged in supporting relation with the said platform only when the said cradle clamp means is released.

21. The combination of claim 20 wherein each of the said cradle clamp means comprises:
- a cradle support tab having one end secured to said end plate and the other end overlying and engaged with the upper face of the said platform,
- a side portion of the said end plate extending beneath and engaged with the lower face of the said platform, and
- releasable fastener means maintaining the said cradle support tab and the said side portion engaged with the said platform.

22. The combination of claim 21 wherein the said support tab comprises the sole support of said cradle frame when the said cradle frame is clamped to the said side tracks.

23. The combination of claim 20 wherein each of the said cradle frame support rollers includes a radial flange engaged with the side edge of the said platform.

24. The combination of claim 19 wherein the said cradle frame includes a pair of side ribs and the said unitary driving means comprises:
- a carrier frame releasably clamped to and positionable along the said side ribs,
- actuating means suspended from the said carrier frame and including a drive pulley,
- a jackshaft brake assembly spaced from the said actuating means and suspended from the said carrier frame including a driven pulley,
- belt means comprising the said drive pulley and the said driven pulley.

25. The combination of claim 24 wherein the said carrier frame comprises:
- spaced apart first and second mounting plates each having ends engaged with the lower face of the said side ribs,
- first and second clamping plates overlying and releasably secured to the said first and second mounting plates respectively each including ends engaged with the upper face of the said side ribs,
- a connector plate having one end overlying and secured to the said first mounting plate and the other end overlying and secured to the said second mounting plate,
- aligned carried frame support rollers journaled on opposed sides of the said connector plate and overlying the upper face of the said side ribs,
- said ends of the said first and second mounting plates cooperating with the ends of the said first and second clamping plates to frictionally clamp the said carrier frame to the said side ribs,
- said actuating means being secured to the said first mounting plate and the said jackshaft brake assembly being secured to the said second mounting plate.

26. The combination of claim 25 wherein
- said carrier frame support rollers are journaled to the said first mounting plate on opposed sides of the said connector plate in overlying spaced apart relation with the upper face of the said side ribs,
- said carrier frame support rollers being in supporting engagement with the said side ribs only when said clamping plates are released.

27. The combination of claim 25 wherein the said connector plate overlies and is slidably secured to one of the said mounting plates.

28. In balancing apparatus for determining the imbalance of a rotor, the combination comprising:
- a base including
  - an external frame having a pair of side rails and a pair of end members,
  - a rigid internal frame having a pair of side tracks and a pair of end members, and
  - uncompressed resilient connecting means extending between adjacent end members of the said external frame and the said internal frame, said connecting means comprising the sole support of the said internal frame;
- a pair of rotor supports moveably secured on the said pair side rails;
- a rotor having shaft ends one each supported by one of the said rotor supports, one of the said shaft ends including a terminal portion extending outboard of one of the said rotor supports;
- a carriage assembly extending transversely between the said pair of side tracks and moveably secured thereon, said carriage assembly being positioned in outboard relation with the rotor support beyond which the said terminal portion extends; and
- unitary drive means carried by the said carriage assembly for driving the said rotor from the said terminal portion.

References Cited in the file of this patent
UNITED STATES PATENTS

| | | |
|---|---|---|
| 1,481,785 | Akimoff | Jan. 29, 1924 |
| 2,054,267 | Ohlson | Sept. 15, 1936 |
| 2,088,553 | Olsen | July 27, 1937 |
| 2,101,718 | Moore | Dec. 7, 1937 |
| 2,177,830 | Janeway | Oct. 31, 1939 |
| 2,559,707 | Burke et al. | July 10, 1951 |
| 2,655,033 | Burrell | Oct. 13, 1953 |
| 2,754,686 | Phelps | July 17, 1956 |
| 2,777,545 | Rockett | Jan. 15, 1957 |
| 2,821,269 | Keil | Jan. 28, 1958 |
| 2,857,764 | Frank | Oct. 28, 1958 |
| 2,938,389 | Mailhot | May 31, 1960 |
| 2,943,491 | Annis | July 5, 1960 |
| 2,980,331 | Gruber et al. | Apr. 18, 1961 |
| 3,077,783 | Stiles | Feb. 19, 1963 |